March 23, 1943.  W. P. TOLBERT  2,314,566
REFLECTOR
Filed Aug. 3, 1940
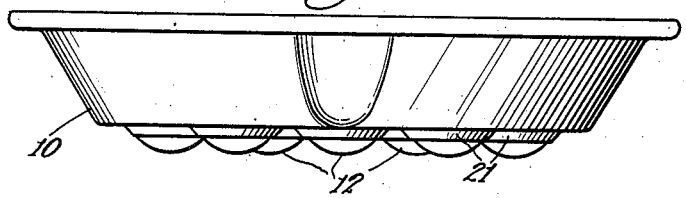
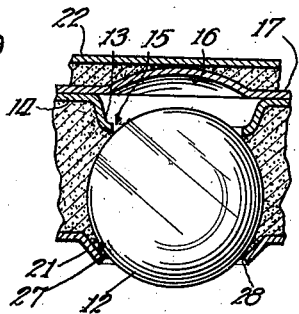
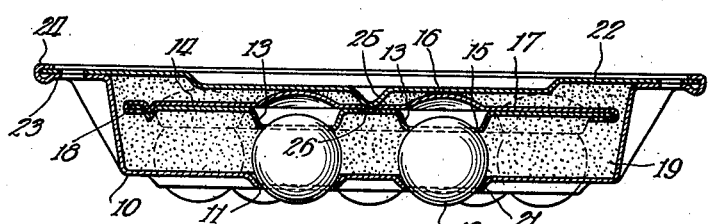
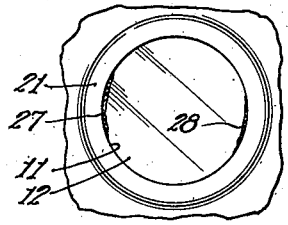
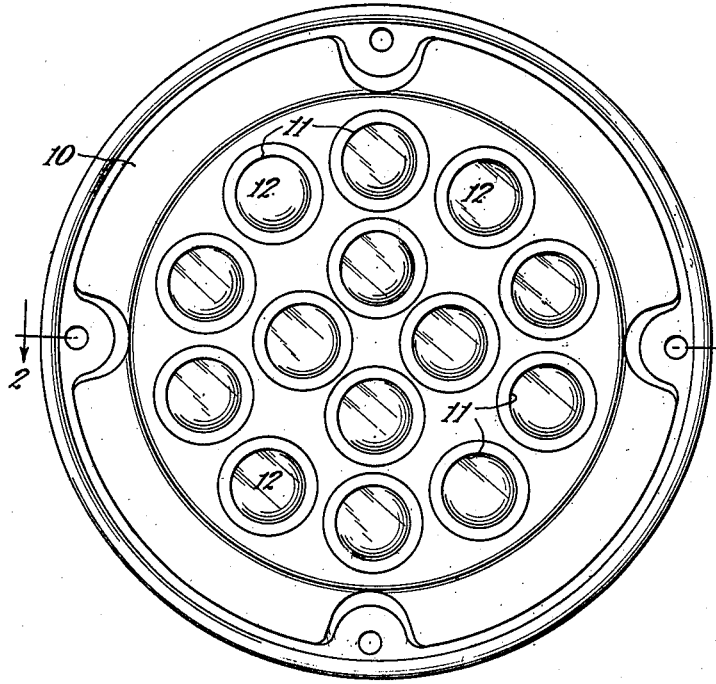
Inventor
William P. Tolbert
By Jabel Burgen Shitybaugh & Wells
Attys.

Patented Mar. 23, 1943

2,314,566

UNITED STATES PATENT OFFICE 2,314,566

REFLECTOR

William P. Tolbert, Fort Madison, Iowa, assignor to Anthes Force Oiler Company, Fort Madison, Iowa, a corporation of Iowa Application August 3, 1940, Serial No. 350,874

3 Claims. (Cl. 88—82)

This invention concerns itself with reflex reflectors, as they are called, used by vehicles on the highways as warning signals in lieu of lights or other media, although it is adaptable to stationary reflectors as well. Such reflectors have the property of reflecting an incident beam back approximately to its source.

Several methods will accomplish the desired results, but as optical accuracy in most systems can only be achieved at a disproportionate expense, it is desirable to use optical media which are cheap to manufacture, and still are relatively accurate. Glass balls and mirrors to the rear of the balls fit these requirements although the glass ball may be replaced with other lens like translucent elements.

A mirror of some sort is necessary to return the incident beam, and in using glass balls or other lens like elements having an index of refraction, say, of 1.52, as lenses, the mirrors must be spaced from the rear surfaces of the balls approximately at their foci. Silver is the customary reflecting surface, although chromium, nickel, and aluminum may be used, and means must be provided to seal a silvered mirror from the oxidizing effects of the ambient atmosphere to preserve the reflector's efficacy. Rubber gaskets have been tried, but they have obvious defects, in that they are affected by moisture, have a relatively short life, their sulphur content adversely affects the silvering on the mirror, and their use necessitates hand assembly methods which add substantially to the cost.

One of the objects of my invention is to provide a reflex reflector of the glass ball type, of few and simple manufactured parts which is easily and cheaply assembled.

Another object of my invention is to provide a reflex reflector which is impervious to moisture. Severe moisture resistance tests for reflectors, including protracted applications of salt water, have been specified by the various state highway commissions, or other supervisory bodies of like character, and the herein described device will readily pass the most severe test of this type which has been devised. In order to protect the device from salt water used in such tests, it is necessary to provide a system of three seals, one at the joint between the protruding portion of the lens and the orifice in the mask, one at the joint between the reflector and the lens, and one at the back of the case where the cover fits the case. Heretofore separate means have been used to seal the joints mentioned. Another object of my invention is to provide a reflector wherein a single means is used to seal all joints.

One of the disadvantages of the ball type of reflector, where rubber gaskets are used as the sealing means, lies in the small field area of the reflector permitted by this construction. Another object of my invention is to provide a reflector of the ball type having a relatively larger field, or effective area per ball, by reason of the protrusion of a greater area of the ball through the mask.

Another disadvantage of the prior ball type reflectors lies in the fact that the balls must be spaced an appreciable distance apart to accommodate the necessary gaskets and seals around each ball. This gives a low field, or effective area, to the reflector in proportion to the area of the mask or case. Another object of my invention is to provide a reflector in which the balls may be arranged as close together as desired even to the extent of touching one another at points in their vertical equators, so that the diameters of the balls determine the limit in number of balls which may be placed within a given circular area. This enables me to attain if desired the effect of a button type of reflector, wherein a multiplicity of collecting and reflecting lenses are cast in a single slug of glass, and at the same time obviates the difficulties which arise in accurately molding such a structure.

It is to be understood that the glass balls to which I have referred are relatively accurate, but all contain minor dimensional inaccuracies. Another object of my invention is to provide a reflector structure using a sealing means which adjusts itself to these inaccuracies more satisfactorily than the mechanical means heretofore used.

As is obvious, the efficacy of a reflector depends upon the permanent accuracy of its optical system. This is difficult to attain when mechanical means are used to maintain the relationship between the lens and reflector, in view of the continuous vibration to which they are subjected in use. The vibrations, and deterioration of gaskets, etc., cause changes in the relative positions of the lenses and their reflectors. Another object of my invention is to provide a mounting for the optical system which is relatively unaffected by vibration.

Other and further objects of my invention will be more particularly described in the annexed specification and claims.

In the drawing, Fig. 1 represents a face view of my reflector;

Fig. 2 is a sectional view thereof taken on the line 2—2 of Fig. 1;

Fig. 3 is a view in side elevation of my reflector;

Fig. 4 is a view in section greatly enlarged showing the assembly of a lens, a reflector and the mask and back plate; and Fig. 5 is a plan view of a single reflector unit on an enlarged scale illustrating how the sealing means adapts itself to irregular inaccuracies in the fit between the mask and the lens.

Referring to Figs. 1 and 2, my reflector comprises a metal stamping 10, serving as a case or mask, having a multiplicity of orifices 11, in the front thereof, slightly smaller in diameter than the greatest diameter of spherical lenses 12 that are seated in the orifices.

Back of each lens is an individual lens spacer 13, (Fig. 2), the several spacers 13 being in the form of cups struck from a plate 14. Each cup 13 has the base apertured as shown at 15 (Figs. 2 and 4) providing a seat to engage against the surface of the ball when assembly is complete. A series of reflectors 16 is held in an optically true arrangement with the seats 15 for lenses 12 by a supporting plate 17 in which the reflectors 16 are formed. The plate 17 has its rim 18 crimped over the peripheral edge of the plate 14 so as to firmly unite these two plates. The reflectors 16 and the seats 15 are arranged in the same pattern in their respective plates and are axially aligned.

The plate 14 has its orifices 15 of approximately the same diameters as the orifices 11 in the mask or case 10. The orifices 15 are arranged in the same pattern as orifices 11. The precise dimension of the lenses 12 and the depth and diameter of the reflectors 16 are governed by the necessities of the optical system, not here involved.

I seal my reflector with a filler, or sealing compound 19, shown in Fig. 2 as filling every interstice within the casing, and forced between the lenses 12 and bosses 21 which are formed around the orifices 11 in the mask 10. The sealing means closes off each space between a reflector 16 and an orifice 15 and covers the back of the plate 17.

The preferred material for a filler must have the property of being readily heated to a pouring temperature, and yet remain solid at all normal temperatures. It is obvious that reflectors used throughout the continental United States must withstand temperatures up to 140° F., and the filler used must have the property of remaining in a completely solid form at such a temperature.

In reference to the proper filler material, the commercial products known as "steep roof" and "battery" asphalts have melting points of approximately 175° F. and the commercial product "hydrocarbon asphalt" has a melting point of approximately 300° F. A mixture of the two types of asphalts, the proportions necessary being readily ascertainable by trial and error, will produce a filler with a melting point of from 190° F. to 200° F., giving an adequate factor of safety.

In order to lessen the expansion and contraction of the filler under temperature fluctuations, it is desirable to mix the asphalts with from 40% to 70% of silica dust, limestone dust, etc., by volume. The amount of limestone or silica dust to be added depends on the closeness of the spacing of the lenses, and can be readily determined.

Pitch has heretofore been used as a cushioning material for reflectors consisting of a single slug of glass backed by trihedral mirrors, its purpose being to retain the glass slug through its adhesive properties and prevent the reflector from shattering when broken. As is obvious, my filler has entirely different properties and functions.

In assembly, the lenses 12 are placed in the orifices 11 in the mask 10 and the reflectors 16 are properly positioned with respect to the lenses 12 by lowering the previously united plates 14 and 17 upon the lenses 12, the lenses being received in the orifices 15. The parts are held assembled either by their own weight or by a suitable clamping device. A predetermined amount of filler in a fluid but viscous state, at a suitable temperature, say in excess of 150° F., is poured into the casing, and the filler is permitted to harden. A cover plate 22 is attached to a flange 23 of the casing 10, the flange 23 being crimped around the rim of the plate 22 at 24. The cover plate 22 has a central boss 25 which is adapted to center itself in a depression 26 in the plate 17. The cover plate may be set in place before the filling compound hardens so that after hardening of the compound there is only one unit to handle.

It will thus be seen that my reflector is impervious to moisture and retains its optically true arrangement as against any normal shocks. If the proper filler is used, the device will not be affected by temperature and the filler will not exude between the surface of a lens 12 and the rim of an orifice 11. Yet the tapered spaces between the bosses 21 and the lenses will be filled to provide an effective moisture proof seal.

Aside from its simplicity and ease of manufacture, the use of such a filler carries distinct advantages: as has been heretofore explained, I use a compound which is fluid but very viscous at temperatures in excess of 150° F.; this is poured or forced into the case after the optical systems are in place, the structure being at room temperature, and as the compound reaches the interstices to be sealed, it is relatively small in volume and being in contact with cooler surfaces, quickly cools to form an effective seal fully adjustable to any dimensional irregularities in the lenses. This is clearly illustrated in Figs. 4 and 5 where the irregularities are indicated at 27 and 28.

It is understood that the foregoing description is illustrative only, and may be departed from without obviating the spirit of my invention as delineated in the appended claims.

I have described the application of my invention to the ball type of reflector, but it will be obvious that it is further applicable to any type of reflector in which the reflecting surface is spaced from the lens, as is more particularly pointed out in the claims.

Having fully described my invention, I claim:

1. A reflector comprising a casing having openings in the front face thereof for lenses, a lens concentric with each opening, a reflector comprising a plate having a series of reflector surfaces, one for each lens, and a centering plate fixed to the reflector plate and having openings concentric with said openings in the casing, both of said plates being spaced from the peripheral wall of the casing, the rims of said openings in said centering plate bearing on the lenses, said plates having means to space the reflectors from the lens receiving openings in the centering plate, and holding means for said centering plate within said casing, said holding means comprising a plastic composition enclosing the plates.

2. A reflector comprising the combination of a front plate having forwardly projecting bosses provided with lens receiving orifices, translucent ball shaped lenses seated in said bosses and protruding partially through said orifices, reflectors spaced rearwardly from said lenses, a reflector supporting member having openings therein into which said lenses extend to align the reflectors with the lenses, and a solid unitary sealing means surrounding said reflectors and said member and extending into the bosses around said lenses whereby to seal the lenses to the front plate and to exclude ambient air from the reflectors.

3. A reflector comprising a pan shaped front casing member having a multiplicity of spaced lens receiving orifices in the face thereof, translucent ball shaped lenses seated in said orifices and protruding partly through them, the member having forwardly projecting tapering bosses around the orifices providing annular walls gradually receding from the lenses from the orifices inward, a plate having raised portions therein, the portions being provided with lens receiving orifices having the same spacing with respect to each other as the orifices in said front casing member have, and said lenses also protruding partly through the second named orifices, a reflector plate fixed on the plate and having concave reflecting surfaces opposite said raised portions and spaced from the parts of the lens protruding through the orifices in said raised portions, a plastic sealing composition filling the casing member and completely enclosing said plates thereby sealing the lenses and the plates in position and excluding air from all parts of the lenses and reflectors except the lens parts protruding from the front of the front casing member.

WM. P. TOLBERT.